United States Patent [19]

Masada

[11] Patent Number: 4,928,001
[45] Date of Patent: May 22, 1990

[54] SECRET INFORMATION PRESERVING SYSTEM FOR A MULTIPLE ISSUER IC CARD

[75] Inventor: Shigeo Masada, Itami, Japan
[73] Assignee: Mitsubishi Denki Kabushiki Kaisha, Toyko, Japan
[21] Appl. No.: 169,473
[22] Filed: Mar. 17, 1988
[30] Foreign Application Priority Data Mar. 20, 1987 [JP] Japan ................... 62-66256

[51] Int. Cl.⁵ ............................................. G06K 5/00
[52] U.S. Cl. ..................................... 235/380; 235/492
[58] Field of Search ........................ 235/380, 379, 492

[56] References Cited

U.S. PATENT DOCUMENTS 4,650,975  3/1987  Kitchener .................. 235/380 X
4,656,342  4/1987  Ugon ........................ 235/380 X
4,683,372  7/1987  Matsumoto ................. 235/380 X
4,736,094  4/1988  Yoshida ..................... 235/380 X

FOREIGN PATENT DOCUMENTS 61-184657  8/1986  Japan .
61-194586  8/1986  Japan .
61-240386  10/1986  Japan .

*Primary Examiner*—David L. Trafton
*Attorney, Agent, or Firm*—Leydig, Voit & Mayer

[57] ABSTRACT

A system for maintaining the secrecy of information stored in a multiple issuer IC card, comprising an IC card which has its memory divided into a plurality of discrete portions, each of which may be accessed only by means of a predetermined different identification code, and a terminal which is used to write an identification code into a portion of the card memory only when it is supplied with an input code which corresponds with an issuer code which was previously stored in that portion of the memory.

6 Claims, 2 Drawing Sheets

SECRET INFORMATION PRESERVING SYSTEM FOR A MULTIPLE ISSUER IC CARD

TECHNICAL FIELD

This invention relates generally to an IC card, and more specifically to an IC card in which the memory is shared by multiple parties.

BACKGROUND ART

A credit card, cash card or the like typically comprises a magnetic card which has a magnetic stripe (i.e., a strip of magnetic tape affixed to the card) memory capable of storing a small quantity of information. Included in the stored information is a secret identification number (PIN or personal identification number) intended to be known only by the user, which allows the user of the card to identify himself and thereby gain access to other information in the data base to which the user terminal is connected.

A subsequent alternative to a magnetic card as a single purpose information access device (e.g., credit card, cash card, door key, etc.) is an integrated circuit (IC) card having an onboard changeable memory. Such an IC card has a memory capacity substantially larger than that of a magnetic card. Where properly identified (e.g., by entry of an appropriate PIN), the user of an IC card may access and modify information stored in both a central data base and in the memory of the card.

Pursuant to a conventional system for issuing a card and registering an identification number for the issued card (see FIG. 3), a card issuer 11 (such as a credit institution) embosses the name of a cardsystem candidate 12 (i.e., a person who wishes to obtain admission to the issuer's card system) and the available admission period on the surface of an unissued card 13. The issuer then stores an account number and sends an issued card 14 to the candidate 12. Upon receipt of the issued card 14, the candidate completes an identification number application 15 and presents it, along with the issued card 14, to a clerk 16 of the card issuer 11. The clerk 16 confirms that the card 14 is one which was issued by the issuer 11, and then enters the identification number into a register 17 by means of a keyboard 18, thereby making a complete card 19 in accordance with the contents of the identification number application 15. The complete card 19 is delivered to the candidate 12 (i.e., user), who may thereafter gain access to stored information by first providing the registered identification number.

As may be appreciated, although it has been tolerated, it is inconvenient for a user to have a plurality of different cards from different issuers. Thus, it may be desirable for a plurality of issuers to share the same memory medium (i.e., card) to provide the user with access to information provided by the issuers (e.g., bank account information, credit account information, etc.). Such sharing would be very superficial in magnetic stripe cards—the issuers share or otherwise interact between different data bases, with the magnetic card allowing the user to access these different data bases. With IC cards, the possibilities increase due to their larger memory capacity, but security problems arise since a greater quantity of potentially sensitive, changeable information can be carried right on the card.

If the above-described conventional code-writing apparatus (register 7 and keyboard 8) is used on this type of multiple issuer IC card, there is a strong possibility that information regarding one of the issuers and the card user (which is accessible through the card) may become known by the other card issuers. This can happen since only the identification number of the card user (e.g., the PIN number) is written in a protected area of memory—all of the other information including all current transaction information, would be available to any issuer. Thus, for example, if a user possessed an IC card capable of performing transactions with four issuers, each of the four issuers would have access to the data, which should be secret, of the other three. Consequently, the conventional coding system creates secrecy problems when used with an IC card which is shared by multiple issuers.

SUMMARY OF THE INVENTION

It is a primary object of the present invention to provide an improved system for maintaining the secrecy of information stored in a memory medium which is administered by a plurality of parties and accessible by means of a single card such that each party may gain access to only that part of the information relating to it.

Moreover, it is an object of this invention to provide a memory medium which may be shared by a plurality of parties by dividing the memory medium into a corresponding plurality of discrete portions each of which may be accessed only by means of a predetermined different identification code.

Other objects and advantages of the invention will be apparent from the following detailed description.

In accordance with the present invention, there is provided a system comprising a multiple issuer IC card and a terminal for reading information from and writing information to the multiple issuer IC card; the multiple issuer IC card comprising memory blocks for assignment to respective issuers and means in each memory block for storing an issuer code of a particular one of a plurality of potential issuers; and the terminal comprising means for reading the issuer codes from the IC card, means for inputting an input code and an identification code, means for comparing the issuer codes and the input code and means for writing, when a match is detected by said comparing means, said identification code into the memory block means storing the matched issuer code, thereby to activate the associated memory block with respect to that particular issuer.

DESCRIPTION OF THE PREFERRED EMBODIMENT

While the invention will be described in connection with certain preferred embodiments, it will be understood that it is not intended to limit the invention to these particular embodiments. On the contrary, it is intended to cover all alternatives, modifications and equivalents included within the spirit and scope of the invention as defined by the appended claims.

In many cases, an IC card has an onboard microprocessor and an onboard memory, access to which is controlled by the microprocessor. In other cases, an IC card has an onboard read/write memory which can be read from, and written to, by a transaction terminal. In contrast, a magnetic stripe card merely comprises a read-only memory which can be read by a transaction terminal.

Figure 1:
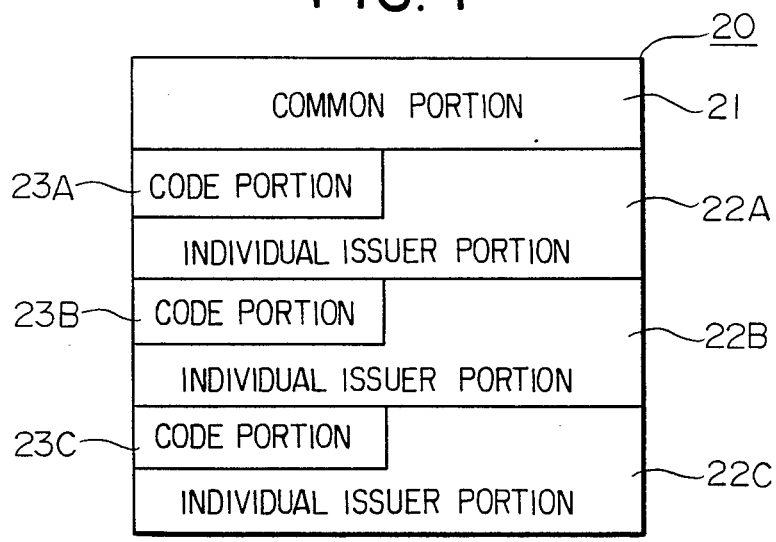
FIG. 1 is a diagram of the disposition of memory blocks of an IC card for use in the inventive system.
Figure 2:
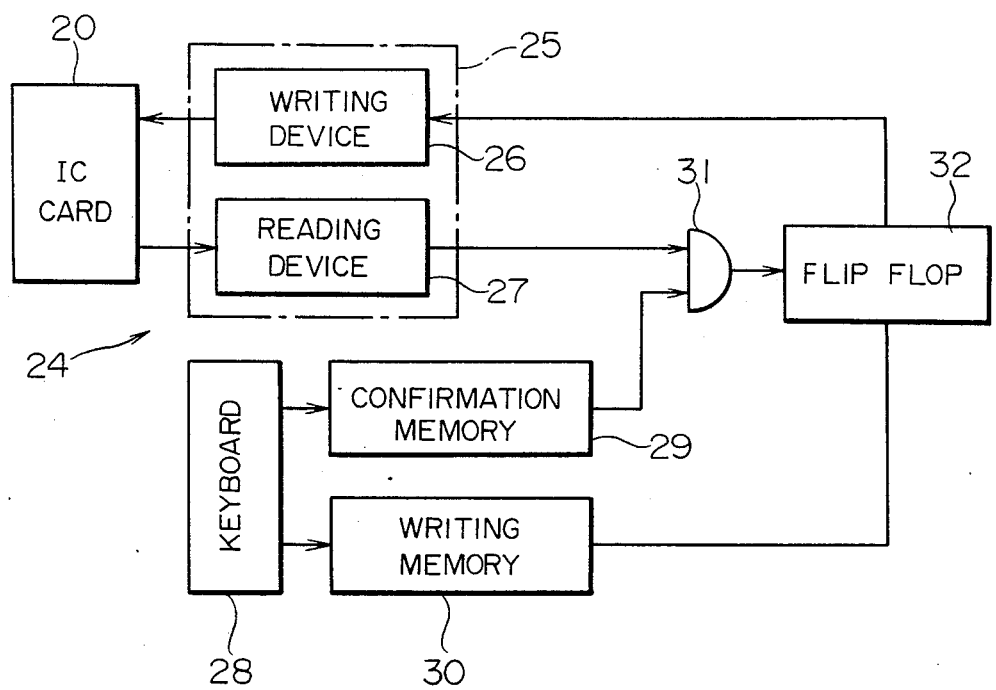
FIG. 2 is a block diagram of an embodiment of the terminal of the inventive system for reading information from and writing information to the memory blocks of an IC card.
Figure 3:
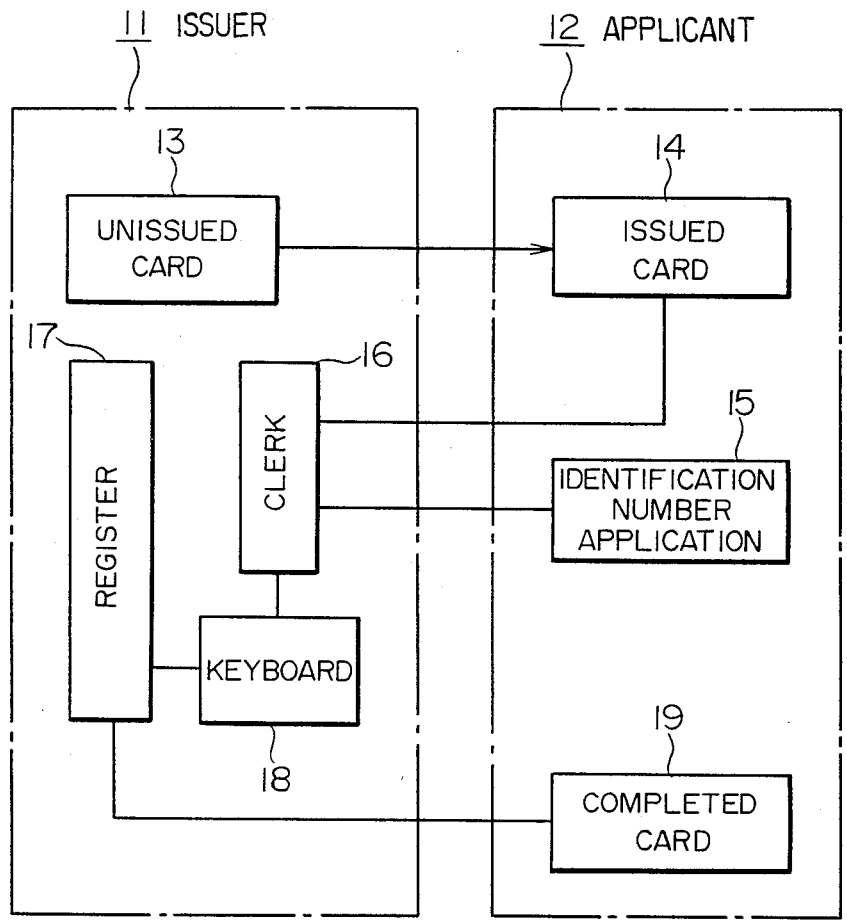
FIG. 3 is a block diagram of a conventional system for registering an identification number on an information access card.

Turning now to the drawings and referring first to FIG. 1, there is shown an embodiment of an IC card 20 which may serve as the memory medium for an exemplary system embodying the present invention. The total memory area of the IC card 20 is divided into a plurality of discreet portions—a common portion 21, individual issuer portions 22A, 22B, 22C, and code portions 23A, 23B, 23C. The common portion 21 contains information (such as the name, address, etc., of the card user) which is common to and can be read by, the plurality of issuers who share the IC card. The individual issuer portions 22A, 22B, 22C contain information which relates to the issuers A, B and C, respectively. For example, the portion 22A assigned to issuer A may contain information (such as bank account or credit card account information) relating to the user's transactions with issuer A. The code portions 23A, 23B, 23C contain codes—such as passwords of the issuers A, B and C, respectively, and the identification code of the card user—which must be known in order to gain access to the information stored in the individual issuer portions 22A, 22B or 22C, respectively.

While the embodiment of FIG. 1 describes an IC card having discreet memory portions for three different issuers, it will be appreciated that the total memory of the IC card 20 could be divided up to accommodate either more or less issuers. In order to ensure the privacy of each issuer's stored information in accordance with the present invention, however, each individual issuer portion of memory must have a corresponding code portion of memory.

A terminal 24 is used for reading information from the code portions 23A, 23B, 23C of the IC card 20 and writing information into those same code portions. This terminal 24 generally comprises a reader-writer 25 having a conventional writing device 26 and a conventional reading device 27 which work in a well-known fashion. Specifically, the writing device 26 performs writing in the code portions 23A, 23B, 23C of the IC card 20, and the reading device 27 reads the contents of those same code portions.

A keyboard 28 is used to input data into the terminal 24, and this input data may be selectively stored in either a confirmation memory 29 or a writing memory 30. A conventional comparing device 31 is adapted to compare the contents of the reading device 27 with the contents of the confirmation memory 29, and a flip flop 32 is connected to the output of the comparing device 31.

Pursuant to the above-described embodiment of the present invention, a card manufacturer will prepare an IC card having its memory arranged as described above in relation to FIG. 1. Specifically, issuer codes XA, XB, XC, previously determined by the card manufacturer and the issuers, are written into the code portions 23A, 23B, 23C, respectively, of the IC card 20. These cards are then delivered to the issuers A, B, C and are ready to be activated. Upon identifying a suitable candidate, the issuers activate the card, entering identification numbers into the appropriate code portions of the card memory so that the applicant (i.e., user) can access the information in the corresponding individual issuer portions of the card memory.

For example, issuer A—who knows the issuer code XA previously entered into its code portion 23A of the IC card memory—inserts the IC card 20 into the reader-writer 25 of the terminal 24. Accordingly, the reading device 27 reads, but does not display, the contents of each of the code portions (including code portion 23A) of the card memory. Issuer A then inputs the issuer code XA into the terminal 24 by means of the keyboard 28, and the issuer code XA is stored in the confirmation memory 29. If the issuer code in the code portion 23A (read by the reading device 27) and the input code XA stored in the confirmation memory 29 coincide with each other, the flip flop 32 is set by the output of the comparing means 31 so that communication is established between the writing memory 30 and the writing device 26, thereby enabling writing into the code portion 23A of the card memory. Once this communication is established, a secret code (e.g., personal identification number) of the card user may be input through the keyboard 28 and stored in the writing memory 30. This identification code (which is known only to the issuer A and the card user) is then registered in the code portion 23A of the card memory along with issuer A's issuer code XA. Consequently, once the secret identification code is entered in the code portion 23A of the memory, only persons who know the issuer code XA and the user's identification code may read information from or write information to the individual issuer portion 22A of the card memory by means of another reading-writing device in any of a plurality of widely dispersed transaction terminals (not shown).

This system for setting a secret identification code into the relevant memory portion of the IC card ensures that persons or organizations (including issuers B and C and the IC card manufacturer) other than the issuer A and the card user cannot gain access to information stored in individual issuer A's portion 22A of the card memory. Even if a third party knows the original issuer code XA stored in the code portion 23A, the information ultimately stored in the individual issuer portion 22A is protected once a secret identification code which must be known to access the memory portion 22A is also entered into the code portion 23A. Thus, if each code portion of the card memory contains a different issuer code and a different secret identification code, the IC card can be shared by the issuers with a very high degree of secrecy for their information.

It is possible for the card user to input the same identification number into all of the code portions 23A–23C of the card memory. In such an arrangement, the card user can access all of the individual issuer portions 22A–22C of the card memory by using the same identification number—the issuer portion accessed by the user for a particular transaction is determined by the issuer's transaction terminal into which the IC card is inserted (or if inserted into a multi-issuer transaction terminal, which issuer is requested for the transaction). Secret information is still protected between the plurality of issuers since each issuer can only access the information in the individual issuer portion of the memory for which it knows the associated issuer code.

It should be noted that it is possible to alter the secret identification codes during the term of use of the IC card. Thus, the secrecy of information can be ensured even if a previously entered identification code becomes known to third parties.

Moreover, it will be appreciated that the issuer code originally set in the IC card 20 may be used to confirm the destination of card delivery (namely, the issuer A, B or C).

In accordance with another embodiment of the present invention, the IC card 20 may comprise an onboard microprocessor which functions as a writing device to directly write the card memory. Consequently, in such an embodiment, the terminal 24 need not include a separate code writing device 26. Rather, there need only be provision for connections between the flip flop 32 of the terminal 24 and the microprocessor of the IC card 20.

As can be seen from the foregoing detailed description, this invention provides an improved system for maintaining the secrecy of information stored in a multiple party memory medium. The memory medium is divided into a plurality of discrete portions, each of which may be accessed only by means of a predetermined issuer code and a predetermined identification code. A terminal is used to write an identification code into a portion of the memory medium only when it is supplied with an input code which coincides with an issuer code which was previously stored in that portion of the memory medium.

What is claimed is:

1. A system comprising a multiple issuer IC card and a terminal for reading information from and writing information to the multiple issuer IC card;

the multiple issuer IC card comprising memory blocks for assignment to respective issuers and means in each memory block for storing an issuer code of a particular one of a plurality of potential issuers; and the terminal comprising means for reading the issuer codes from the IC card, means for inputting an input code and an identification code, means for comparing the issuer codes and the input code and means for writing, when a match is detected by said comparing means, said identification code into the memory block means storing the matched issuer code, thereby to activate the associated memory block with respect to that particular issuer.

2. The system of claim 1 wherein said writing means comprises a flip flop and a writing device, said flip flop being connected between said inputting means and said writing device and being responsive to said comparing means such that said inputting means and said writing device communicate with each other to write said identification code only when a match is detected.

3. The system of claim 1 wherein each of said memory block means stores an identification code along with an issuer code.

4. A system comprising a multiple issuer IC card and a terminal for reading information from and writing information to the multiple issuer IC card;

the multiple issuer IC card comprising memory blocks for assignment to respective issuers, means in each memory block for storing an issuer code of a particular one of a plurality of potential issuers, and a writing device for writing information to said memory block means; and the terminal comprising means for reading the issuer codes from the IC card, means for inputting an input code and an identification code, means for comparing the issuer codes and the input code and means for connecting said inputting means and said writing device to one another such that, when a match is detected by said comparing means, said identification code is written into the memory block means storing the matched issuer code, thereby to activate the associated memory block with respect to that particular issuer.

5. The system of claim 4 wherein said connecting means comprises a flip flop which is responsive to said comparing means such that said inputting means and said writing device communicate with each other only when a match is detected.

6. The system of claim 4 wherein each of said memory block means stores an identification code along with an issuer code.

* * * * *